Patented May 28, 1929.

1,715,086

UNITED STATES PATENT OFFICE.

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE.

METHOD OF REFINING ROSIN.

No Drawing. Application filed August 23, 1926, Serial No. 131,125. Renewed December 7, 1928.

My invention relates to a process of treating rosin, both wood rosin, which, while marketable, is of a low grade, and the lower grades of gum rosin, so as to remove therefrom practically all of the objectionable coloring matter and produce a high grade rosin adapted for use in sizing the lightest colored grades of paper and in the manufacture of the lightest colored grades of varnish and which is so thoroughly purified and refined that it is adapted for use in the manufacture of high grade rosin soaps and limed varnishes of satisfactory color, as well as for most, if not all, other purposes to which the higher grades of gum rosin are adapted.

The rosin to be purified by my process may be produced as such from either wood or gum rosins by any of the usual and well known processes, or the rosin may be purified as found in "drop liquor", which, as is well known, is produced by flooding wood stock, from which turpentine has been removed by steam, with gasoline, and which contains chiefly rosin, pine oil and various coloring bodies.

In carrying out the process embodying my invention, the rosin, especially wood rosin, may be subjected to any desired preliminary distillation process, or the rosin may be distilled after subjecting it to my refining process, but such is not necessary and is preferably omitted.

Now in accordance with my invention the rosin to be purified, in solution in a suitable solvent, is treated with a chlorohydrin for the extraction of color bodies from the rosin.

Chlorohydrins, as for example, ethylene chlorohydrin, propylene chlorohydrin, etc., are, as is well known, produced by the reaction of hypochlorous acid with an ethylene bond, and I have discovered that such have the capacity for selectively extracting or dissolving color bodies from rosin.

Typical of the practice of my invention using, for example, ethylene chlorohydrin as the purifying agent, the following treatment of wood rosin will be illustrative:—

Wood rosin, produced by any of the known processes, is dissolved in a suitable solvent, for example, gasoline or other light petroleum distillate, to form a rosin solution containing say about 15%, by weight, of rosin to which is added ethylene chlorohydrin, which may be anhydrous or there may be a considerable proportion of water present. For example, to say 500 parts of gasoline-rosin solution, containing 15% rosin, there is added 125 parts of ethylene chlorohydrin, containing for example 25% of water. The rosin solution and chlorohydrin are then thoroughly mixed, as by agitation.

The mixture of gasoline-rosin solution and ethylene chlorohydrin, after thorough mixing is allowed to separate into layers, the lower one of which is primarily ethylene chlorohydrin and extracted color bodies, with a small proportion of the rosin, since the chlorohydrin has a slight solvent power on the rosin, and the upper one of which is primarily gasoline and rosin, from which the color bodies have been extracted by the chlorohydrin, with a small amount of ethylene chlorohydrin. The chlorohydrin is soluble in the gasoline at certain temperatures, its solubility decreasing with reduction of temperature below normal atmospheric temperatures, therefore, separation may be facilitated and made more complete by effecting the separation into layers at a reduced temperature, say a temperature of about 8° C.

The lower layer comprising primarily ethylene chlorohydrin and color bodies and the upper layer comprising primarily gasoline-rosin solution are separated by any convenient method, as by gravity or the use of centrifugal force. The gasoline-rosin solution will contain a small amount of chlorohydrin, since the chlorohydrin is to an extent soluble in the gasoline at the suggested temperature of about 8° C. The dissolved chlorohydrin may be extracted from the gasoline-rosin solution by washing with water, or it may be recovered with the gasoline, which as will appear, is distilled off for the recovery of the purified rosin. The purified rosin is recovered by distilling off the gasoline. The gasoline may be recovered by condensation for reuse. The yield of purified rosin will be found to be about 81% of the original, will grade H in color and will give a soap which will show only a slight amount of discoloration on aging.

The chlorohydrin has some solvent power on rosin, hence the separated chlorohydrin contains some rosin, as has been indicated, which may be recovered as refined rosin, for example, by extracting with gasoline, or it may be recovered as low grade rosin by distilling off the chlorohydrin and refined by re-dissolving in gasoline and extraction with chlorohydrin.

As a further illustration of the carrying out of the process involving my invention, for example, to 800 parts of gasoline-rosin solution, containing about 15% rosin, there is added 250 cc. of anhydrous ethylene chlorohydrin, the mixture thoroughly agitated and then allowed to separate, the temperature of the mixture having been reduced to say a temperature of $-12°$ C. The recovery of refined rosin will amount to about 56%, grading K in color and affording a soap showing practically no discoloration on aging.

In the carrying out of my process, it will be understood that, while for purposes of illustration I have described my process in connection with ethylene chlorohydrin, various chlorohydrins or mixtures thereof may be used and further that the amount of chlorohydrin used for the refining of any given amount of rosin may be used as a single wash or divided and used as a plurality of washes.

In carrying out the process according to my invention the chlorohydrin may, if desired, be caused to go into solution in the rosin solvent and a homogeneous solution of rosin, solvent and chlorohydrin formed, it being only necessary to have the mixture of rosin, solvent and chlorohydrin at a temperature at which the chlorohydrin will dissolve in the solvent, separation of the chlorohydrin and color bodies from the rosin solution being subsequently effected by a reduction of the temperature of the solution to a point where the major portion of the chlorohydrin will be insoluble in the rosin solvent and hence will be thrown out of solution along with the color bodies.

The preferred solvent for the rosin is the gasoline cut of petroleum, but it will be understood that any light petroleum distillate may be used unless its boiling range is above that of kerosene, and it is my intention that where in the claims appended hereto gasoline is specified the use, as a solvent for the rosin, of any operative equivalent for gasoline, which is substantially immiscible with the chlorohydrin shall be included as an equivalent of gasoline.

Having now fully described my invention, what I claim and desire to protect by Letters Patent is:—

1. In the method of refining rosin the step which includes subjecting rosin to treatment with a chlorohydrin for the removal of color bodies from the rosin.

2. In the method of refining rosin the step which includes subjecting rosin in solution to treatment with a chlorohydrin capable of immiscibility with the rosin solution for the removal of color bodies from the rosin.

3. The method of refining rosin, which includes dissolving rosin in a solvent normally substantially immiscible with a chlorohydrin, treating the rosin solution with a chlorohydrin for the extraction of color bodies from the rosin, separating chlorohydrin and color bodies from the rosin solution and recovering refined rosin from the rosin solution.

4. The method of refining rosin, which includes dissolving rosin in a solvent normally substantially immiscible with ethylene chlorohydrin, treating the rosin solution with ethylene chlorohydrin for the extraction of color bodies from the rosin, separating ethylene chlorohydrin and color bodies from the rosin solution and recovering refined rosin from the rosin solution.

5. The method of refining rosin, which includes dissolving rosin in a solvent normally substantially immiscible with a chlorohydrin, treating the rosin solution with a chlorohydrin for the extraction of color bodies from the rosin, reducing the temperature of the rosin solution, separating chlorohydrin and color bodies from the rosin solution and recovering refined rosin from the rosin solution.

6. The method of refining rosin, which includes dissolving rosin in gasoline, treating the gasoline-rosin solution with a chlorohydrin for the extraction of color bodies from the rosin, separating chlorohydrin and color bodies from the gasoline-rosin solution and recovering refined rosin from the gasoline-rosin solution.

7. The method of refining rosin, which includes dissolving rosin in gasoline, treating the gasoline-rosin solution with ethylene chlorohydrin for the extraction of color bodies from the rosin, separating ethylene chlorohydrin and color bodies from the gasoline-rosin solution and recovering refined rosin from the gasoline-rosin solution.

8. The method of refining rosin, which includes dissolving rosin in gasoline, treating the gasoline-rosin solution with a chlorohydrin for the extraction of color bodies from the rosin, reducing the temperature of the gasoline-rosin solution, separating chlorohydrin and color bodies from the gasoline-rosin solution and recovering refined rosin from the gasoline-rosin solution.

9. The method of refining rosin, which includes dissolving rosin in a solvent normally substantially immiscible with a chlorohydrin, adding a chlorohydrin to the rosin solution for the extraction of color bodies from the rosin, heating the rosin solution to a temperature at which chlorohydrin will go into solution in the rosin solution, cooling the solution formed to a temperature at which chlorohydrin and color bodies will be thrown out of solution from the rosin solution, separating chlorohydrin and color bodies from the rosin solution and recovering refined rosin from the rosin solution.

10. The method of refining rosin, which includes dissolving rosin in a solvent normally substantially immiscible with ethylene chlorohydrin, adding ethylene chlorohydrin to the rosin solution for the extraction of color bodies from the rosin, heating the rosin solution to a temperature at which ethylene chlorohydrin will go into solution in the rosin solution, cooling the solution formed to a temperature at which ethylene chlorohydrin and color bodies will be thrown out of solution from the rosin solution, separating ethylene chlorohydrin and color bodies from the rosin solution and recovering refined rosin from the rosin solution.

11. The method of refining rosin, which includes dissolving rosin in gasoline, adding a chlorohydrin to the gasoline-rosin solution for the extraction of color bodies from the rosin, heating the gasoline-rosin solution to a temperature at which chlorohydrin will go into solution in the gasoline-rosin solution, cooling the solution formed to a temperature at which chlorohydrin and color bodies will be thrown out of solution from the gasoline-rosin solution, separating chlorohydrin and color bodies from the gasoline-rosin solution and recovering refined rosin from the gasoline-rosin solution.

12. The method of refining rosin, which includes dissolving rosin in gasoline, adding a chlorohydrin to the gasoline-rosin solution for the extraction of color bodies from the rosin, heating the gasoline-rosin solution to a temperature at which chlorohydrin will go into solution in the gasoline-rosin solution, cooling the solution formed to a temperature from about $-8°$ C. to about $-12°$ C., separating chlorohydrin and color bodies from the gasoline-rosin solution and recovering refined rosin from the gasoline-rosin solution.

In testimony of which invention, I have hereunto set my hand, at Kenvil, N. J., on this 12th day of Aug., 1926.

IRVIN W. HUMPHREY.